United States Patent [19]

Pujol

[11] 4,188,053
[45] Feb. 12, 1980

[54] MACHINE FOR AUTOMATICALLY TYING THE ENDS OF SAUSAGES AND THE LIKE

[75] Inventor: Yves A. Pujol, Albi, France

[73] Assignee: S.A.T.E.M. St d Application des Techniques Electriques et Mecaniques, Albi, France

[21] Appl. No.: 826,707

[22] Filed: Aug. 22, 1977

Related U.S. Application Data

[63] Continuation-in-part of Ser. No. 733,402, Oct. 18, 1976, abandoned.

[30] Foreign Application Priority Data

Dec. 10, 1976 [FR] France ............................ 76 30852

[51] Int. Cl.² ........................................ B65H 69/04
[52] U.S. Cl. .................................. 289/18.1; 426/512
[58] Field of Search ................. 289/2, 18; 17/33, 34, 17/35; 99/441; 426/105, 512

[56] References Cited

U.S. PATENT DOCUMENTS

| 3,318,623 | 5/1967 | Barrosa ............................ 289/18 X |
| 3,473,292 | 10/1969 | Eaudlitz ............................ 289/18 X |
| 3,940,169 | 2/1976 | Kock ............................ 289/18 X |

FOREIGN PATENT DOCUMENTS

| 518606 | 3/1940 | United Kingdom ...................... 289/18 |
| 142166 | 4/1961 | U.S.S.R. .................................... 289/2 |

OTHER PUBLICATIONS

The Ashley Book of Knots by Clifford W. Ashley, Doubleday & Co. Inc., Garden City, New York, 1946, p. 308.

Primary Examiner—Louis Rimrodt

[57] ABSTRACT

There is disclosed a machine for automatically forming a knot around an article such as a sausage and the like. The object to be tied is introduced into aligned tubes, and a thread, a cord or the like is interlaced around the tubes by the following operations: rotation and translation of a cord pressing member which first presses and then releases the cord, a forward and back movement of a member for retaining the cord, and the forward and back motion of a separator. The tightening of the cord is brought about by the action of a gripper carried by the separator and by a means for tensioning the cord, while the cord is deposited upon the object by reason of the separation of the tubes. A cutting means which operates at the end of the cycle cuts off the end of the cord upstream of the knot. The invention can be used to tie a number of different objects as well as sausages.

16 Claims, 11 Drawing Figures

MACHINE FOR AUTOMATICALLY TYING THE ENDS OF SAUSAGES AND THE LIKE

This application is a continuation-in-part of application Ser. No. 733,402, filed Oct. 18, 1976, now abandoned.

This invention relates to an automatic machine for forming in each cycle a knot in a thread, cord, or the like about an object; it is applicable in particular in the preparation of sausages and permits filled sausage casings to be tied automatically with a knot known as a "noeud de cabestan" in France and as a clove hitch knot in the U.S.A. Up until now there has not been a machine which gives entire satisfaction in the automatic forming of capstan knots so that the tying off of sausages is carried out manually, an operation which requires the exercise of considerable force and thus is quite tedious.

The present invention overcomes such lack and provides a machine which functions automatically without human intervention.

Another object of the invention is to provide a machine suitable for operating at high speed, on the order of 20 knots a minute. In the case of the tying of sausages, such speed is adapted to the speed of production of a "sausage stuffer", which is disposed upstream of the sausage tying machine and carries out the filling of the sausage casings.

Another object of the invention is the provision of a machine capable of operation without failure in a humid atmosphere, such as is in the case in the preparation of sausages.

In order to simplify terminology, the word "cord" will be used hereinafter to designate a textile thread, a cord, twine, flexible metal strand, etc.

The machine in accordance with the invention incorporates means for feeding cord, and is characterized by the following:

two aligned tubes carried by a frame and forming a hollow arbor adapted to contain the object to be tied, such tubes being disposed end to end and being associated with means for alternately bringing them together in end to end engagement and for separating them;

a rotor carried by one of the tubes and guided in rotation so as to turn about it, said rotor being associated with driving means to carry out its turning movement;

a cord pressing means carried by the rotor and associated with driving means permitting it while rotating with the rotor to move parallel to the axis of the tubes between a retracted position and an advanced position, the cord pressing means being provided with a pressing element with means to move it so that the cord is either pressed or freed;

means for retaining the cord disposed in proximity to the tubes in a longitudinal position intermediate the retracted position and the advanced position of the cord pressing means, said retaining means being associated with driving means adapted to move radially with respect to the tubes so as to engage one of them and to retain the cord, or to move away from the tube and to free the cord;

a separator guided in a path passing in proximity to the cord presser through such angle that the separator grips the portion of the cord held between the cord pressing means and the tubes, such separator being associated with means for driving it along said path;

gripping means driven so as to allow it to be deposed upon the trajectory or path of the cord pressing means and to grip the cord at the end of the cycle so as to permit the replenishing of the cord by the pressing means, said gripping means being associated with driving means which opens and closes it;

driven cutting means having at least one cutting blade, such cutting means being moved to the path of the cord between the path of the cord pressing means and one of the tubes so as to cut the cord, such cutting means being movable away from the path of the cord; and controlling means adapted to start or stop the various driving and cord manipulating means described above at the appropriate instant in the cycle.

The manner of operation of the various means described above will be described in detail later on in a preferred embodiment, which permits the invention to be more readily understood. Notably in the case of the tying of sausages, the machine is by preference operated to tie a knot of the afore-described type with a double loop; the controlling means is thus designed to cause, at appropriate times in each cycle, a rotation of the rotor approximately equal to a total of 900° in view of the formation of the two loops, two linear forward and return motions of the cord retaining means with a motion of gripping and releasing the cord, a forward and return movement of the cord retaining means, a forward and return movement of the separator along its path, a displacement of the cutting means with a return to its retracted position, and a retraction of the two tubes from each other with a return of the tubes to the position in which they abut.

As will be understood more fully below, the machine produces a knot of the afore-described type which is tightened around the object (sausage or the like) and is then ready for a new cycle.

In accordance with a preferred embodiment, particularly for operation in a humid atmosphere, the driving means and the means for moving the various instrumentalities comprised single or double acting pneumatic cylinders, the cylinder driving the rotor being associated with a transmission including a rack and pinions; the control means is of a pneumatic nature and includes pneumatic switching means and a pneumatic logic assuring the proper control of the cycle. Such a machine dispenses entirely with means driven electrically and is designed to operate without failure in a humid atmosphere, in particular under those difficult conditions which exist during meat packing operations.

Other characteristics of the invention will become apparent in the following description, upon reference to the attached drawings, which set forth a non-limiting exemplary embodiment.

In the drawings, which form a part of the description.

Figure 1:
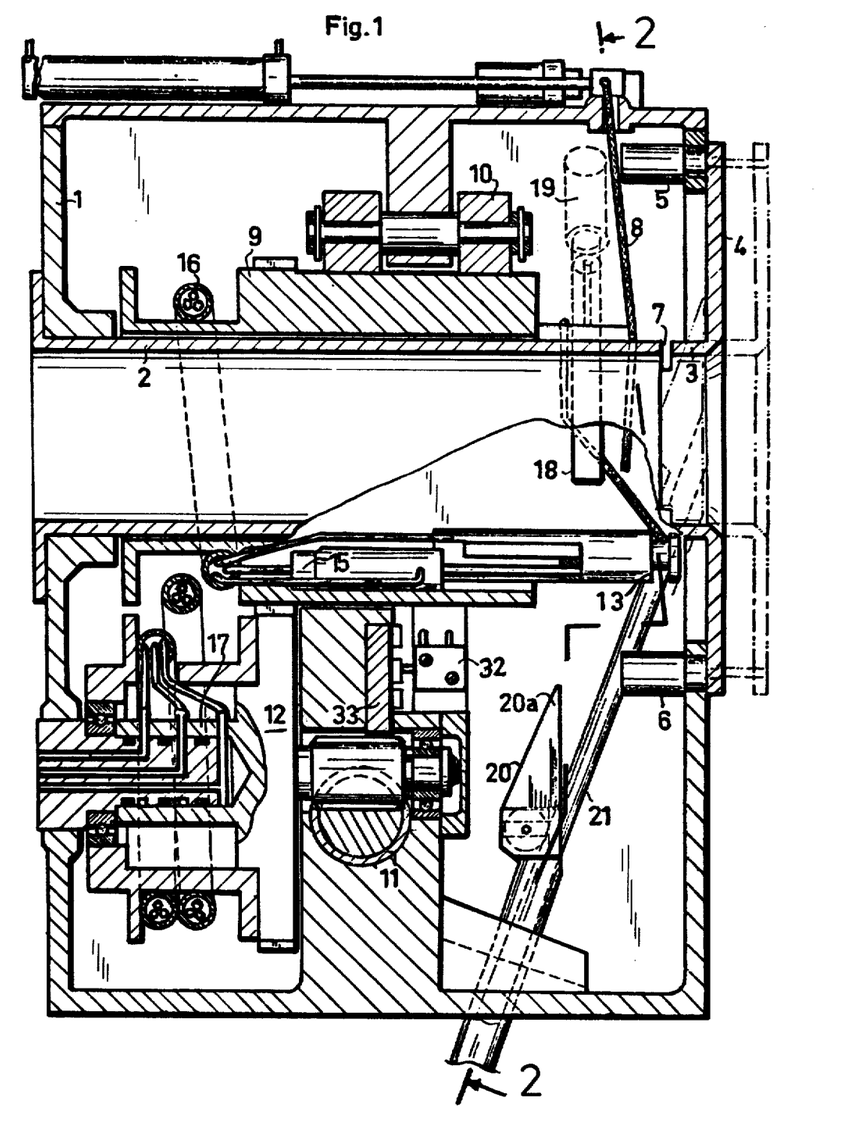
FIG. 1 is a view in longitudinal vertical section of the illustrative embodiment of the device, the section being taken along the line 1—1 in FIG. 2.
Figure 2:
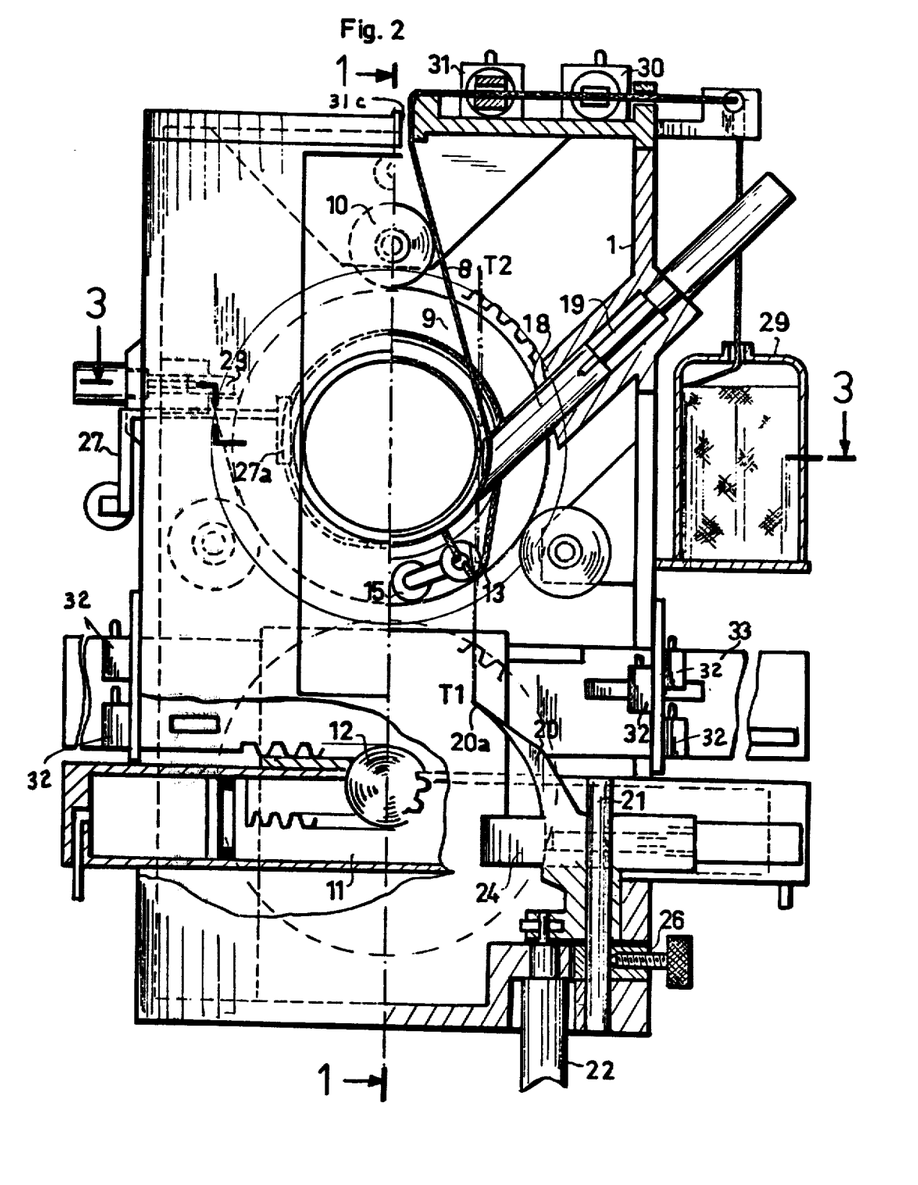
FIG. 2 is a view partially in section and partially in elevation of the machine of FIG. 1, the portion of the machine at the right being shown in section taken along the broken line 2—2 in FIG. 1 and the remainder of the figure being shown in elevation.
Figure 3:
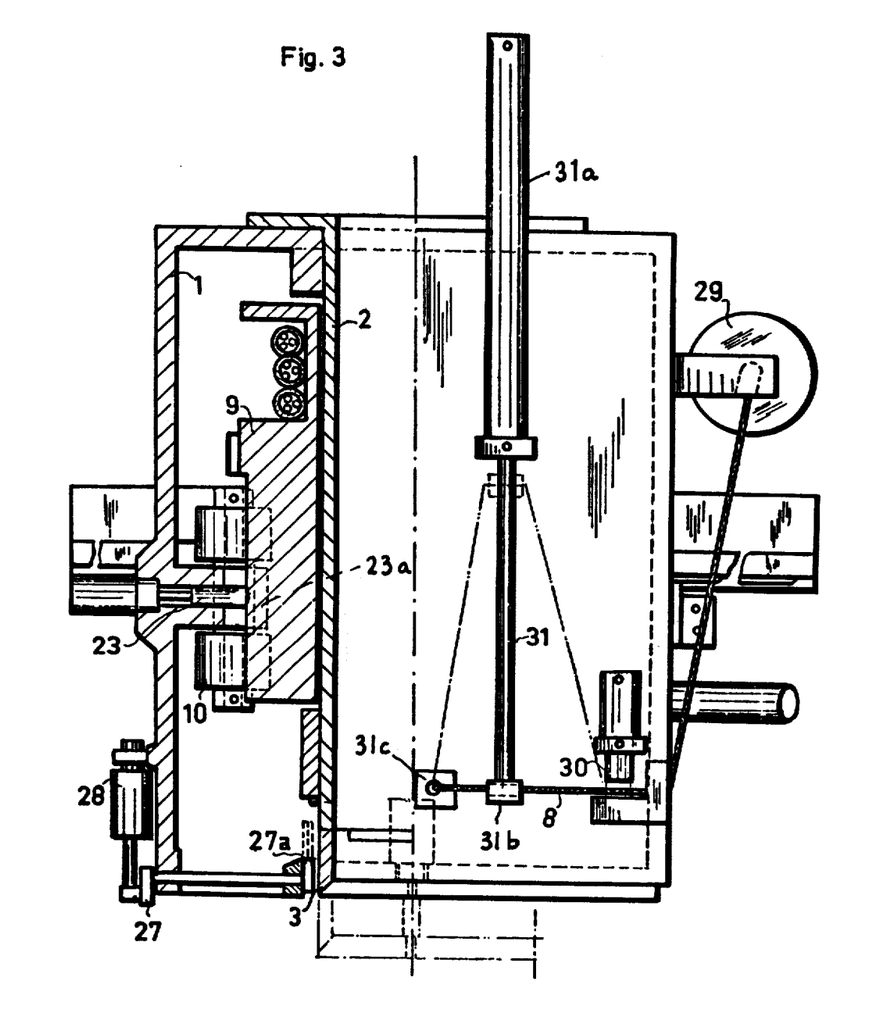
FIG. 3 is a view in partial section through the machine of FIGS. 1 and 2, the rotation of the machine at the left being a view in horizontal section taken along the broken line 3—3 in FIG. 2, the remainder of the figure showing the machine in plan.

Turning now to FIGS. 1, 2 and 3, the illustrative embodiment of the machine there shown has a frame generally in the form of a parallelepiped which supports the various units of the machine. As shown in FIG. 1, affixed to the left hand side of the frame there is a first tube 2, at the right hand end of which there is disposed a movable tube 3 coaxial with tube 2. In the embodiment shown, the tube 3 is much shorter than tube 2, and is carried by a vertical plate 4 which is reciprocated by small pneumatic cylinders 5 and 6, the cylinders reciprocating the plate 4 and the tube 3 between the solid line and phantom line positions thereof shown in FIG. 1. Two openings or notches 7 are provided in the left hand end of tube 3 to provide a passage for the tying cord and to prevent full end engagement between the tubes 2 and 3 when the tube 3 is in its full line position. Such openings are not needed if the object, such as a sausage, to be tied by the cord is ejected from the tubes before the tube 3 reaches its full line position. In FIG. 1 the cord, which is designated 8, is shown in one of the positions which it assumes during the tying cycle.

A rotor 9 is mounted on the frame for turning around tube 2, the rotor being guided by rollers 10 mounted upon inwardly projecting portions of the frame. The rotor 9 is driven by a cylinder 11 through the intermediary of a transmission 12 which includes pinions and a rack gear.

Rotor 9 carries a cord pressing means 13 mounted upon the rotor and turning with it. The cord pressing means 13 is shown in detail in FIGS. 4 and 5. As there shown means 13 is constituted by a first pressing element 13a against which the second element 13b is forced by a single acting pneumatic cylinder 14 having a retracting spring 14a. The cord 8 is pressed between the elements 13a and 13b.

Furthermore, the cord pressing means 13 is driven lineally by the piston rod 15a of a double acting pneumatic cylinder 15 which is also mounted in the rotor 9. The cord pressing means 13 thus may be moved between a retracted position to the left, in the rotor and an advanced position, shown in FIGS. 1 and 4.

Compressed air is supplied to the cylinders 14 and 15 by means including three flexible conduits disposed in a flexible casing 16 which is coiled upon and uncoiled from drums connected to the rotor 9 and to the transmission, and a rotatable air transmitting joint 17 located at the level of the transmission. It is to be noted that when the object to be tied is of small diameter, or the tubes 2 and 3 are themselves of small diameter, the transmitting joint may be disposed directly upon the rotor to eliminate the flexible conduits and casing.

Near the right hand end of the tube 2 there is provided a cord retaining means 18 disposed in a longitudinal position intermediate between the retracted (left) position and advanced (right) position (FIG. 1) of the cord pressing means 13. Means 18 is associated with a double acting pneumatic cylinder 19 which moves the means 18 radially with respect to the tube 2 so as to move it against the tube as shown in FIG. 2 or to retract it therefrom. In its first, advanced position shown in FIG. 1, means 18 is adapted to retain the cord, while in the second, retracted position, shown in FIG. 2, it is positioned remote fom the tube and leaves open a path to the cord presser 13 regardless of whether the means 13 is in its advanced (forward) position or its retracted position.

Figure 4:
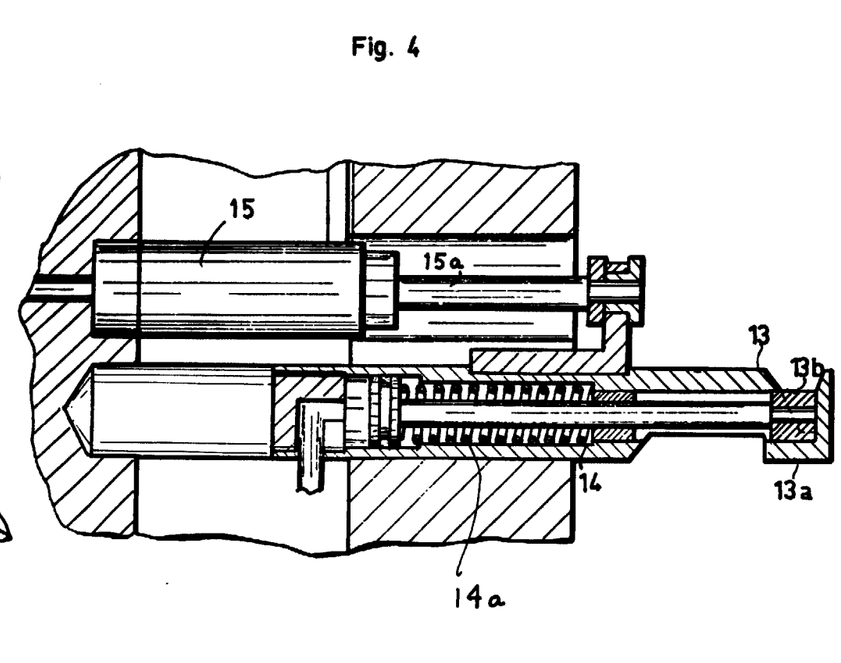
FIG. 4 is a view in detail in longitudinal section.
Figure 5:
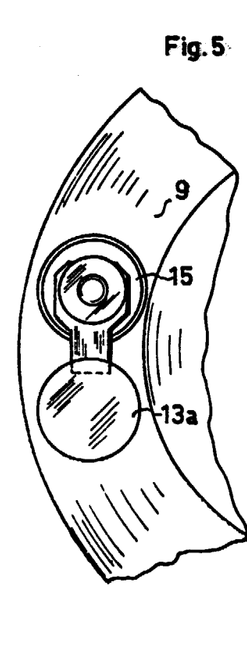
FIG. 5 is a view in elevation of a part of the machine at the right lower corner in FIG. 3, the view being taken in a direction upward in FIG. 3, certain of the parts being shown in vertical section.
Figure 6:
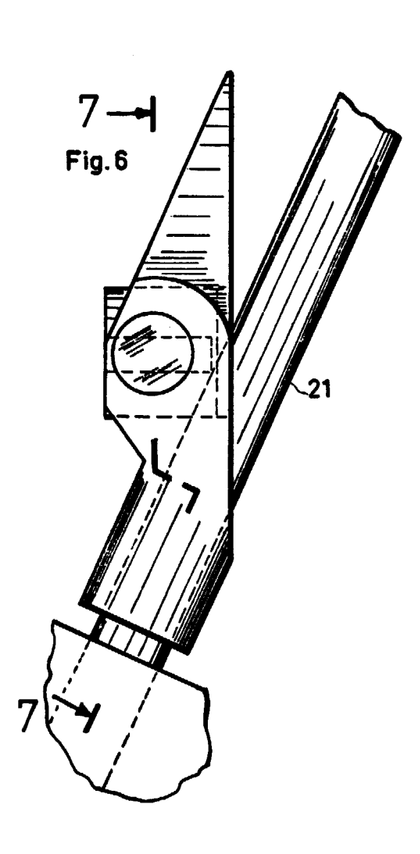
FIG. 6 is a view in detail of another part of the machine, the view being in elevation.
Figure 7:
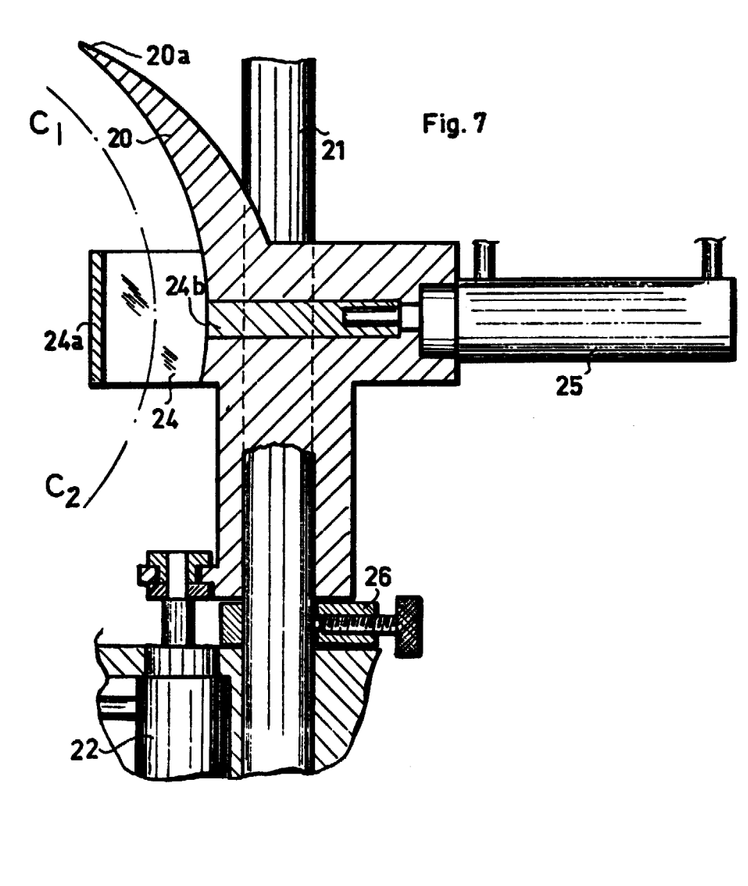
FIG. 7 is a view in detail of the part of the machine shown in FIG. 6, the view being partially in section and partially in elevation, the section being taken along the broken line 7—7 in FIG. 6.

Moreover, a separator 20 shown in detail in FIGS. 6 and 7 is guided by inclined (FIG. 1) column or rod 21 and reciprocated therealong by a double acting pneumatic cylinder 22. Separator 20 includes a curved nose the upper end 20a of which travels along a path $T_1$, $T_2$ (FIG. 2) which is tangent to the external wall of tube 2 and tangent to the cord pressing means 13 when the latter is in the predetermined angular position shown in FIG. 2. The cord pressing means 13 is moreover indented or grooved as shown in FIG. 4 to allow the nose of the separator to pass very close to its internal shaft.

Thus in its passage, the nose of the separator 20 catches the portion of the cord which is held between the tube 2 and the cord pressing means 13.

It is to be noted that the angular position above referred to of the cord pressing means 13 itself is determined in a very precise manner by the arresting of the rotor by a stopping means provided for this purpose; in the embodiment shown, such rotor stopping means is shown at 23 in FIGS. 2 and 3; means 23 is constituted by a stopping finger driven by a small pneumatic cylinder, a small shoulder 23a (FIG. 3) disposed on the rotor engaging the stopping finger when the finger is in its radially inner, advanced position.

The separator 20 carries a gripping means 24 disposed in the concavity of the curved separator and being adapted to be advanced into the position shown in FIG. 7 during the travel of the separator. Means 24 is constituted by a fixed jaw 24a and a movable jaw 24b driven by a double acting pneumatic cylinder 25. When the jaw 24b is retracted, the two jaws 24a and 24b leave a space between them sufficient to permit passage of the cord pressing means 13; in the closed position of means 24, the jaw 24b is advanced against the jaw 24a.

Thus at the upper end of its travel, after having gripped and hung up a loop of the cord, the nose 20a of the separator 20 is in such position that its curve approximates concentricity with the tubes 2 and 3 and an annular passage is formed for the cord pressing means 13 between the nose of the separator and the tubes; in the course of its turning movement the cord pressing means 13 in its advanced position travels along the path C1, C2 (FIG. 7), passes between the jaws of the gripping means 24, and thus leads the cord to pass between the jaws thereof. This permits the means 24 to grip the cord to allow the run of the cord downstream to tighten the knot, and also to assure the presentation of a new length of cord by the cord pressing means for the following cycle.

An adjustable stop 26 (FIG. 2) associated with the separator 20, in the embodiment shown, mounted upon the column or rod 21 which guides it, permits the adjustment of the path of the separator and, as a result, the adjustment of the length of the run of the cord downstream of the knot.

A cutting means 27, shown in FIGS. 2 and 3, permits the cord to be cut off. Means 27 in the embodiment shown has a single blade 27a, which, under the action of a pneumatic cylinder 28, can be advanced across the path of the cord between the tube 2 and the path of the cord pressing means 13. It is to be understood that it is possible to employ as a cutting means a scissor-type device having two blades.

The cord is supplied from a ball or package thereof disposed in a container 29 and is guided by annular guides in its passage from the container 29 to the work zone as shown in FIGS. 1 and 2.

A cord tensioning means is disposed downstream of the cord supply 29 between two guides; such means incorporates a pneumatic brake 30 which retards the unwinding of the cord, a fixed guide 31c and a means 31 for pulling the cord, means 31 being disposed downstream of the brake 30 and upstream of guide 31c. Means 31 includes a pneumatic cylinder 31a carrying at the end of its piston rod a bushing 31b through which the cord passes. When the piston rod of cylinder 31a is retracted, as shown in phantom lines in FIG. 3, a salient zone is formed in the cord 8 between brake 30 and the fixed guide 31c.

The machine is completed by a pneumatic control means which starts or stops the action of the various cylinders at the appropriate times in the cycle. Such pneumatic control means may be one well known in the pneumatic control art; such control means 32 incorporates pneumatic valves, of the type receiving escaped air. As shown in FIGS. 1 and 2, means 32 is disposed along a horizontally reciprocable rack 33 which has openings 32a therethrough to permit the passage of compressed air at the correct times to various air receivers. The rack is driven by the transmission 12 in such manner as to move it transversely of the machine during the course of a cycle.

The structure of the machine and the functions of its various units having been described, there will now be described the operation of the machine as a whole by reference to schematic FIGS. 8, 9, 10 and 11. The same reference characters employed in the preceding description are employed in these figures.

Figure 8:
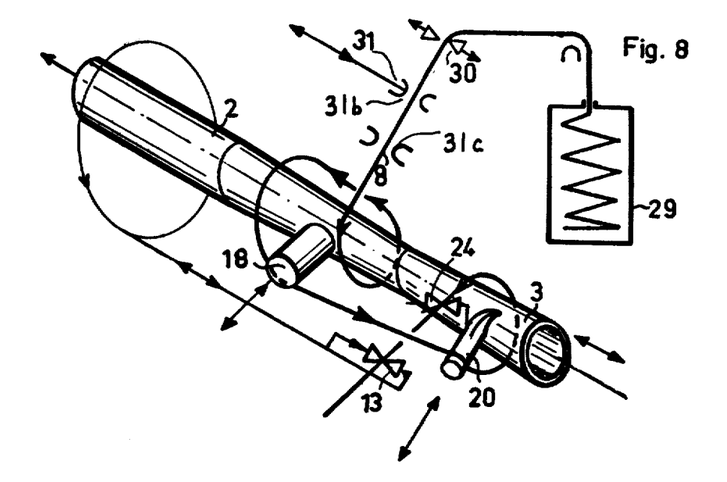
FIGS. 8, 9, 10 and 11 are schematic views in perspective which illustrate progressive portions of the cycle of operation of the machine; in some of these figures the parts of the machine have been simplified or deformed in order to facilitate comprehension of the operation.

Referring first to FIG. 8:

At the beginning of the cycle, the cord 8 is seized by the cord pressing means 13 which is then in an advanced position; after a rotation of between 200 and 270 degrees of the rotor 9 and the means 13, depending upon the length of the downstream portion of the cord desired, the cord pressing means 13 moves to its retracted position and the cord retaining means 18 advances into engagement with the tube 2. After such movement of the cord retaining means 18, the cord pressing means 13 advances, the separator 20 rises, and the nose of the separator engages the cord and hangs up a loop of it as the separator moves up. The rotor carrying the cord pressing means 13 then begins its rotation. The cord retaining means 18 is retracted from the tube 2 and thus frees a passage for the cord. At the end of the rotation of the rotor and the cord pressing means 13, the cord pressing means passes between the jaws of the cord gripping means 24 carried by the separator 20.

The interlacing of the parts of the cord is ended; the cord gripping means 24 closes and seizes the cord, the cord pressing means 13 opens and frees the cord, and then goes back to its retracted position.

Figure 9:
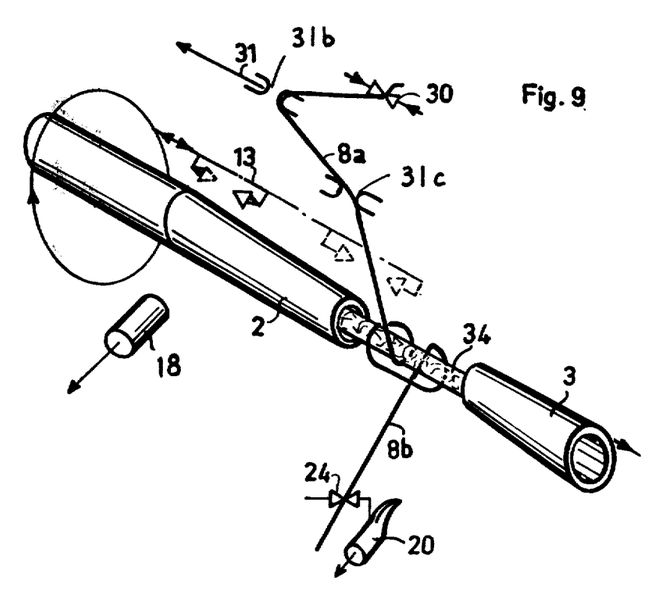

Referring now to FIG. 9:

An article, for example an elongated filled sausage casing 34, is introduced into the tubes 2 and 3. Such introduction gives rise to a pneumatic signal which starts the operation of tightening the knot. The tubes 2 and 3 separate, the rotor 9 performs a return rotation (about 900°). The pneumatic gripper 30 located at the entry of the knot forming portion of the machine presses the length of the cord upstream of the section 8a of the cord. The pulling cylinder 31 is actuated and pulls upon the length of cord 8a into a salient portion between brake 30 and fixed guide 31c. The separator 30 descends with its gripping means 24, means 24 exerting a traction upon the portion 8b of the cord downstream of the knot. The knot is thus disposed upon the object to be tied, in this case the elongated sausage 34, and tightens around the sausage by reason of the concomitant actions of the gripping means 24 and the pulling cylinder 31. The adjustable length of the path of movement of the separator 20 and its gripping means 24 define the length of the portion 8b of the cord.

Figure 10:
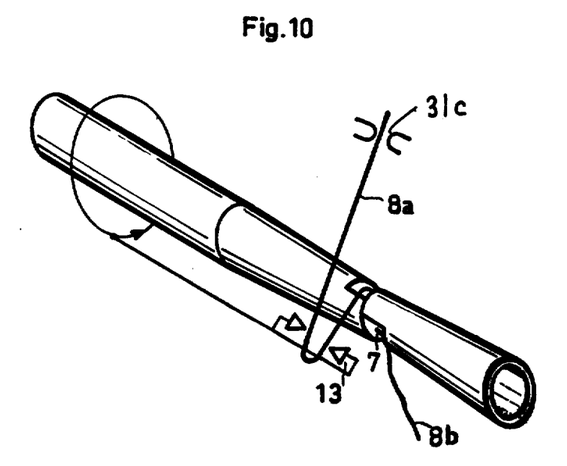
Figure 11:
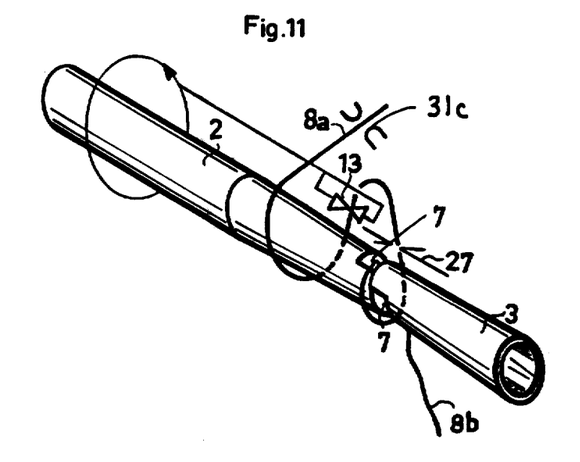

Referring now to FIGS. 10 and 11:

The pneumatic gripper 30 and the gripping means 24 open to free the upstream end 8a and the downstream end 8b of the cord, respectively. The pressing means 13 advances to be ready to engage the cord. The tube 3 returns to its position (FIG. 1) against the tube 2, the openings or notches 7 in tube 3 preventing the engagement of the runs of the cord by the tube. The rotor 9 begins a new working rotation. The pressing means 13 in its open condition engages the run of cord 8a. When the length of this run 8a located between such pressing means 13 and the previously formed knot attains the desired length, the pressing means 13 closes in order to pull a length of cord from its supply 29, such length of cord becoming the length of cord downstream of a new knot to be formed and the cutting means 27 travels across a path of the cord and cuts it. The pulling cylinder 31 returns to its at-rest position shown in full lines in FIG. 3; the cord pressing means 13 again assumes its retracted position in the rotor, and a new cycle begins.

The length of the upstream portion 8a of the cord is adjusted by adjusting the position of the cutting means 27 with respect to the path of travel of the cord.

The now tied object or sausage may be ejected automatically or manually from the extremity of the tube 2 or that of tube 3. In the case of the use of the machine for tying sausages in a meat packing plant, the introduction of a new sausage will initiate the ejection of the previously tied sausage. The order to tie the knot may be given by an operator or by means of the preceding machine in an assembly line, such as the sausage stuffer.

The machine above-described may be utilized in a number of applications wherein one wishes to form a self-tightening knot around an object. For the best utilization of the machine, particularly in oxidizing or humid environments, the various parts of the machine may be made of synthetic plastic materials or from non-corrodible metals; the absence of electrically operated units and of frictional members such as cams and the like makes the machine capable of long service without breakdown.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A machine for automatically binding with a cord the end of a sausage or the like longitudinal article, comprising
   means for unwinding a cord from a spool of binding cord;
   a first tube axially movably and rotatably mounted in said machine and having a first projection, said cord being adapted to be looped around said first tube and first projection in a first step;
   a second tube axially movably mounted in said machine relative to said first tube, said cord being adapted to be looped around said second tube in a second step;
   and means operatively mounted in said machine and coacting with said cord and first and second tubes to form a clove-hitch knot around said longitudinal article when it has been positioned in axial alignment with said first and second tubes.

2. The machine as set forth in claim 1, comprising means for operating said machine pneumatically.

3. The machine as set forth in claim 2, wherein the machine includes a plurality of moving parts and a plurality of pneumatic cylinder and piston actuating mechanisms, each mechanism having a piston which reciprocates in its cylinder and is operatively connected to a moving part of the machine.

4. The machine as set forth in claim 2, including pneumatic signal receiving and transmitting means operatively connected to a source of pressurized air and the various pneumatic actuating mechanisms, said signal receiving means being adapted to receive pneumatic signals and to activate the pneumatic actuating mechanisms in accordance with the received signals.

5. The machine as set forth in claim 4, wherein one of said actuating mechanism is a separator and another one is a stop, and the stroke of the piston of the separator is adjustable by the stop.

6. The machine as set forth in claim 5, including means for adjusting the length of one free end of the binding cord at the moment of its formation of the knot.

7. The machine as set forth in claim 6, wherein the machine comprises a pair of coaxial hollow cylindrical selectively separable members which define an arbor for holding the article being tied, and means for separating the members to deposit a knot formed thereon upon the article within them.

8. The machine as set forth in claim 7, comprising means for adjusting the length of the other free end of said binding cord.

9. An automatic machine according to claim 4, comprising an adjustable position stop for the separator so as to adjust the path of the separator and also to adjust the length of the run of the cord extending downstream of the knot.

10. An automatic machine which at each cycle forms a knot in a cord about an object, comprising a frame, a source of supply of a cord, means for feeding the cord from its source of supply,
    two coaxial tubes carried by the frame and presenting a passage therewithin adapted to contain the object to be tied, such tubes being disposed end to end, means selectively driving at least one of the tubes to move them relatively toward and away from each other in an axial direction;
    a rotor carried by one of the tubes, means guiding it for rotation so as to be turned about such tube, and driving means for turning the rotor;
    a cord pressing means carried by the rotor, and driving means therefor permitting it, during rotation of the rotor, to move in a path substantially parallel to the axis of the tubes between a retracted position and an advanced position, such cord pressing means being provided with a pressing member associated with means for moving it permitting it to be moved to press the cord or free it;
    means for retaining the cord located in the proximity of the tubes in a longitudinal position intermediate between the retracted position and the advanced position of the cord pressing means, driving means for the cord retaining means for reciprocating it radially with respect to the tubes between a position in which it engages one of the tubes and a retracted position in which it moves radially outwardly from such tube;
    a separator guided in a path passing in proximity to the cord pressing means to an angular position determined by the cord pressing means, the separator being adapted to engage the run of the cord held between the cord presser and the tubes, and driving means for the separator which moves it along such path;
    a cord gripping means disposed to be positioned on the path of the cord pressing means and to grip the cord at the end of the cycle so as to permit the renewal of the supply of the cord by the cord pressing means, and means for operating selectively to open and close it; the cord gripping means which permits its closing or its opening;
    a cord cutting means, driving means for the cutting means which moves at least one cutting blade with which the cutting means is provided to cross the path of the cord between the cord pressing means and one of the tubes so as to cut the cord, after which it retracts the cutting means from the path of the cord;
    and control means adapted to start or stop the actions of the driving means and the means for moving the various above-defined operating means at appropriate times in the cycle.

11. An automatic machine according to claim 10, wherein it is adapted to form a capstan knot with two loops around the object, the control means is adapted to cause at the appropriate time in each cycle, a rotation of the rotor approximately equal to 900 degrees to form the two loops in the cord, the cord pressing means perform two linear movements, forward and return, with movements of pressing and releasing of the cord, the cord retaining means performs a forward and return movement, the separator performs a forward and return movement along its path, the cord gripping means opens and closes, the cord cutting means performs a cutting stroke and returns to its retracted position, and the two tubes are retracted from each other and subsequently return to their abutting position.

12. An automatic machine according to claim 10 wherein all of the driving means comprise pneumatic cylinders, the pneumatic cylinder driving the rotor being associated with a transmission having a rack gear and pinions, the control means being a pneumatic controller including pneumatic captors and a pneumatic logic.

13. An automatic machine according to claim 10, wherein the cord gripping means is carried by the cord separator in such manner as to place itself in the path of the cord pressing means after the movement of such separator, the cord gripping means being constituted by a fixed jaw and a movable jaw permitting the passage between them of the cord pressing means when the jaws are separated.

14. An automatic machine according to claim 13, wherein the separator includes a curved nose having a concavity in which the cord gripping means is disposed, the separator being guided in such manner that the end of the nose follows a path tangent to the tubes to hang up a length of the cord in its passage, the nose of the separator at the end of its movement toward the tubes being in such position that its concavity closely approximates concentricity with the tubes and that an annular passage is preserved for the travel cord pressing means between the nose and the tubes.

15. An automatic machine according to claim 10, comprising a tension means for the cord disposed downstream of the cord supply to participate in the tightening of the knot, such means including means for braking the cord.

16. An automatic machine according to claim 10, comprising means for stopping the rotor in a precisely determined position corresponding to the angular position of the cord pressing means at the time when the separator begins its travel to hang up a loop in the cord.

* * * * *